United States Patent
Bisset et al.

(10) Patent No.: US 6,493,612 B1
(45) Date of Patent: Dec. 10, 2002

(54) SENSORS ARRANGEMENT (75) Inventors: David Lindsey Bisset, Wiltshire (GB); Alan Gerard Clark, Wiltshire (GB)

(73) Assignee: Dyson Limited, Malmesbury (GB)

( * ) Notice: Subject to any disclaimer, the term of this patent is extended or adjusted under 35 U.S.C. 154(b) by 0 days.

(21) Appl. No.: 09/868,492
(22) PCT Filed: Dec. 6, 1999
(86) PCT No.: PCT/GB99/04090
§ 371 (c)(1), (2), (4) Date: Jun. 18, 2001
(87) PCT Pub. No.: WO00/38026
PCT Pub. Date: Jun. 29, 2000

(30) Foreign Application Priority Data

Dec. 18, 1998 (GB) ............................................ 9827758

(51) Int. Cl.⁷ .......................... G01C 22/00; G05D 1/00; A47L 11/00; A47L 13/00
(52) U.S. Cl. .......................... 701/23; 701/22; 180/167; 180/168; 180/169; 180/180; 318/580; 318/587; 318/868.16; 340/943; 340/435; 15/319; 15/323; 15/339; 15/340.1; 706/905
(58) Field of Search .................. 701/23.1, 22; 180/167, 180/168, 169, 280; 706/905; 318/580, 587, 568.16; 340/943, 435; 15/319, 323, 339, 340.1; 134/18, 21, 6

(56) References Cited

U.S. PATENT DOCUMENTS 5,279,672 A  *  1/1994  Betker et al. ................. 134/18
5,321,614 A     6/1994  Ashworth .................... 180/167
5,341,540 A     8/1994  Soupert et al. ............... 15/319
5,377,106 A  * 12/1994  Drunk et al. ................ 180/167
5,548,512 A  *  8/1996  Quraishi ..................... 180/167
5,682,313 A  * 10/1997  Edlund et al. ............... 342/127
5,913,919 A  *  6/1999  Bauer et al. ................. 180/169
5,995,884 A  * 11/1999  Allen et al. .................. 180/167
6,055,042 A  *  4/2000  Sarangapani ................. 180/167
6,076,025 A  *  6/2000  Ueno et al. .................... 701/23
6,076,226 A  *  6/2000  Reed .............................. 15/319
6,119,057 A  *  9/2000  Kawagoe ....................... 15/319
6,338,013 B1 *  1/2002  Ruffner ...................... 180/167
2001/0004719 A1 * 6/2001  Sommer ....................... 701/23

FOREIGN PATENT DOCUMENTS

FR      2 695 342 A1   3/1994
WO      WO 93/03399    2/1993
WO      WO 97/41451   11/1997

* cited by examiner

Primary Examiner—William A. Cuchlinski, Jr.
Assistant Examiner—Ronnie Mancho
(74) Attorney, Agent, or Firm—Morrison & Foerster LLP (57) ABSTRACT

An autonomous vehicle, such as a robotic cleaning device, includes wheels which support the vehicle and allow the vehicle to traverse a surface. Downward looking wheel sensors sense the presence of a surface in front of the wheels. Another sensor is provided at or near a leading edge of the vehicle for sensing the presence beneath the leading edge of the vehicle. The vehicle is arranged so that movement of the vehicle is possible if the leading edge sensor senses that there is no surface beneath the leading edge of the vehicle, provided that the wheel sensors indicate that there is a surface adjacent to the wheel. When the leading edge sensor senses that there is no surface beneath the leading edge of the vehicle, the vehicle performs an edge following routine.

13 Claims, 11 Drawing Sheets

SENSORS ARRANGEMENT

This application claims priority to International Application No. PCT/GB99/04090 which was published on Jun. 29, 2000.

FIELD OF THE INVENTION

The invention relates to an arrangement of sensors for an autonomous vehicle, particularly but not exclusively for an autonomous vacuum cleaner.

BACKGROUND OF THE INVENTION

An autonomous vehicle generally has a plurality of sensors for detecting obstacles in the path of the vehicle to prevent collision or accidents. While some autonomous vehicles can cope with undulating surfaces, they usually need to avoid any areas where there is a significant change in height, such as stairs where there is a danger that the machine can become stuck or fall, causing damage to the vehicle and to others. It is know to provide an autonomous vehicle with sensors that monitor the presence of a surface; these are often called "downlooking" or "drop-off" sensors.

A robotic cleaning device described in Patent Application WO 93/03399 has drop-off sensors at a forward edge of the cleaning device and is arranged to stop the drive motors when one of the dropoff sensors senses the absence of a surface beneath the cleaning device. U.S. Pat. No. 5,377,106 describes an unmanned cleaning vehicle with four drop-off sensors mounted on a bumper and side walls of the vehicle. The vehicle stops if any of the sensors senses an excessive distance between the sensor and the floor.

Safety regulations require that downlooking sensors should cause the vehicle to stop whenever the sensors detect the absence of a surface. This places severe constraints on flexibility of controlling the vehicle near to any places where these is a significant change in height. The present invention seeks to provide more flexibility in operating an autonomous vehicle under these conditions.

SUMMARY OF THE INVENTION

According to a first aspect of the invention, there is provided an autonomous vehicle comprising wheels for supporting the vehicle and for allowing the vehicle to traverse a surface, downward looking wheel sensors for sensing the presence of a surface in front of the whells, a further sensor at or near a leading edge of the vehicle for sensing the presence of a surface beneath the leading edge of the vehicle and a control apparatus for controlling movement of the vehicle, the control apparatus being arranged to permit movement of the vehicle when the leading edge sensor detects the absence of a surface beneath the leading edge of the vehicle, providing the wheel sensors indicate the presence of a surface adjacent the wheel. This has the advantage of allowing more flexibility in controlling movement of the cleaning device.

Preferably, the vehicle is arranged to operate so that when the leading edge sensor detects the absence of a surface beneath the leading edge of the vehicle, the vehicle performs an edge following routine. The edge following routine can be a zig-zag movement along the edge, or it can use a further downloading sensor which senses the presence of a surface adjacent a side edge of the vehicle.

Further aspects of the invention provide a method of operating an autonomous vehicle, software for performing a method of controlling operation of an autonomous vehicle and a control apparatus for controlling operation of an autonomous vehicle.

An embodiment of the present invention will now be described, by way of example only, with reference to the accompanying drawings, wherein:

DETAILED DESCRIPTION OF THE INVENTION

The embodiment illustrated takes the form of an autonomous vacuum cleaner. The vacuum cleaner 100 shown in the said drawings has a supporting chassis 102 which is generally circular in shape and is supported on two driven wheels 104 and a castor wheel 106. The chassis 102 is preferably manufactured from high-strength moulded plastics material, such as ABS, but can equally be made from metal such as aluminium or steel. The chassis 102 provides support for the components of the cleaner 100 which will be described below. The driven wheels 104 are arranged at either end of a diameter of the chassis 102, the diameter lying perpendicular to the longitudinal axis of the cleaner 100. Each driven wheel 104 is moulded from a high-strength plastics material and carries a comparatively soft, ridged band around its circumference to enhance the grip of the wheel 104 when the cleaner 100 is traversing a smooth floor. The soft, ridged band also enhances the ability of the wheels 104 to mount and climb over small obstacles. The driven wheels 104 are mounted independently of one another via support bearings (not shown) and each driven wheel 104 is connected directly to a motor 105 which is capable of driving the respective wheel 104 in either a forward direction or a reverse direction. By driving both wheels 104 forward at the same speed, the cleaner 100 can be driven in a forward direction. By driving both wheels 104 in a reverse direction at the same speed, the cleaner 100 can be driven in a backward direction. By driving the wheels 104 in opposite directions, the cleaner 100 can be made to rotate about its own central axis so as to effect a turning manoeuvre. The aforementioned method of driving a vehicle is well known and will not therefore be described any further here.

Figure 4A:
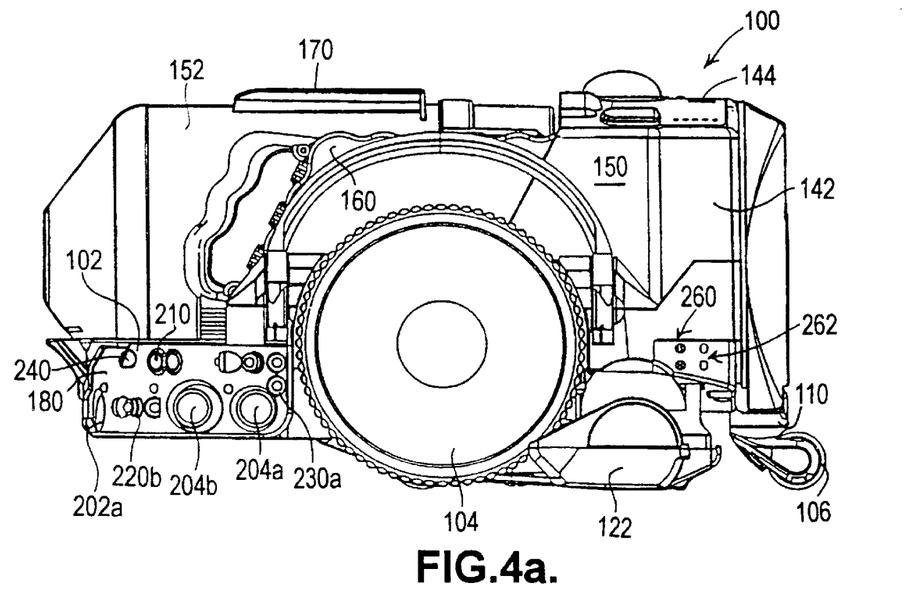
FIGS. 4a and 4b are side views, taken from the right and left sides respectively, of the autonomous vehicle of FIG. 1.
Figure 4B:
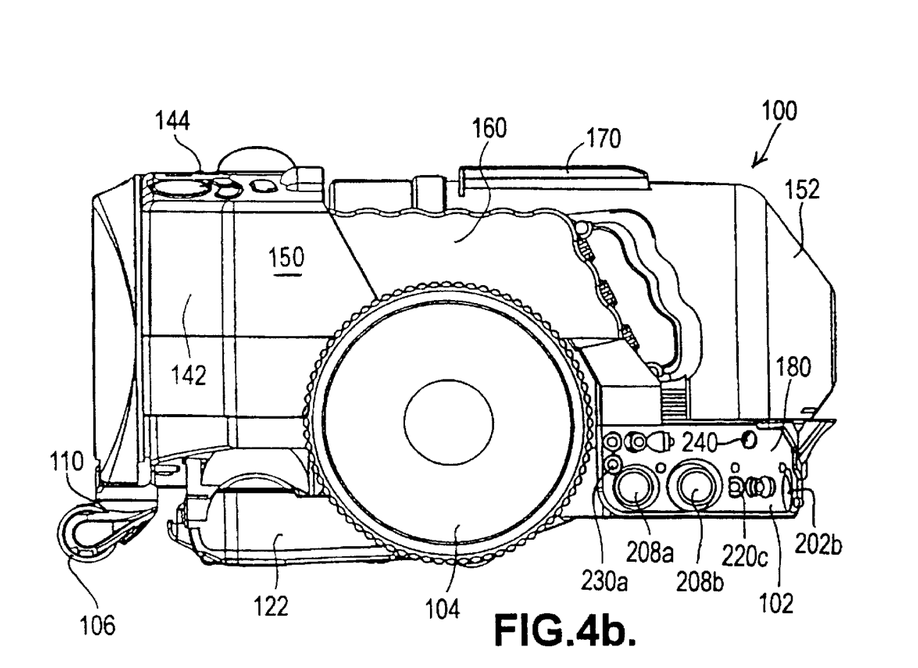

The castor wheel 106 is significantly smaller in diameter than the driven wheels 104 as can be seen from, for example, FIGS. 4*a* and 4*b*. The castor wheel 106 is not driven and merely serves to support the chassis 102 at the rear of the cleaner 100. The location of the castor wheel 106 at the trailing edge of the chassis 102, and the fact that the castor wheel 106 is swivellingly mounted on the chassis by means of a swivel joint 110, allows the castor wheel 106 to trail behind the cleaner 100 in a manner which does not hinder the manoeuvrability of the cleaner 100 whilst it is being driven by way of the driven wheels 104. The castor wheel 106 can be made from a moulded plastics material or can be formed from another synthetic material such as Nylon.

Mounted on the underside of the chassis 102 is a cleaner head 122 which includes a suction opening 124 facing the surface on which the cleaner 100 is supported. The suction opening 124 is essentially rectangular and extends across the majority of the width of the cleaner head 122. A brush bar 125 is rotatably mounted in the suction opening 124 and a motor (not shown) is mounted on the upper surface of the cleaner head 122 for driving the brush bar 125 by way of a drive belt (not shown) extending between a shaft of the motor and the brush bar 125. The cleaner head 122 is mounted on the chassis 102 in such a way that the cleaner head 122 is able to float on the surface to be cleaned. This is achieved in this embodiment in that the cleaner head 122 is pivotally connected to an arm (not shown) which in turn is pivotally connected to the underside of the chassis 102. The double articulation of the connection between the cleaner head 122 and the chassis 102 allows the cleaner head to move freely in a vertical direction with respect to the chassis 102. This enables the cleaner head to climb over small obstacles such as books, magazines, rug edges, etc. Obstacles of up to approximately 25 mm in height can be traversed in this way. A flexible or telescopic conduit is located between a rear portion of the cleaner head 122 and an inlet port located in the chassis 102.

Figure 5A:
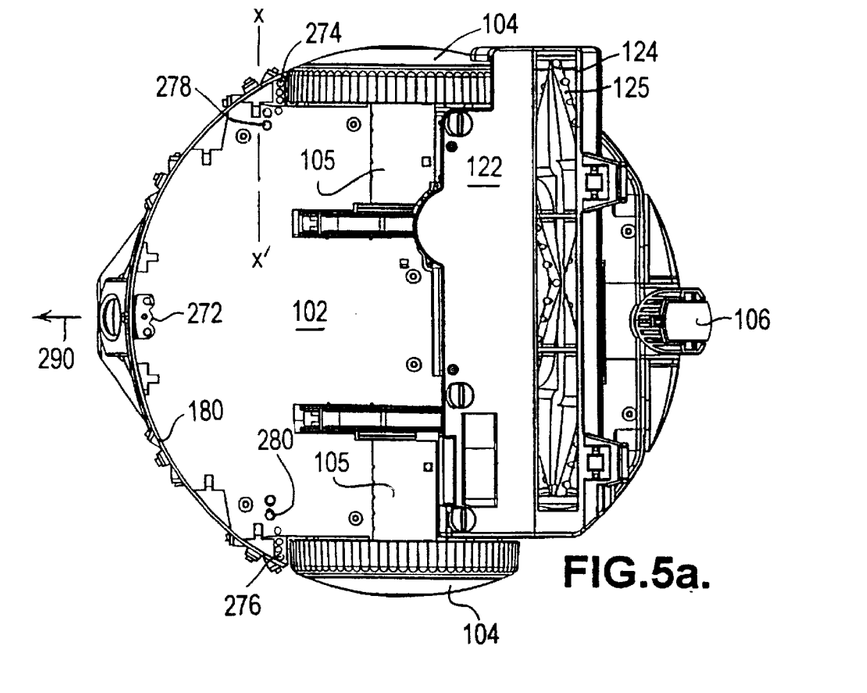
FIGS. 5a and 5b are underneath and plan views respectively of the autonomous vehicle of FIG. 1.
Figure 5B:
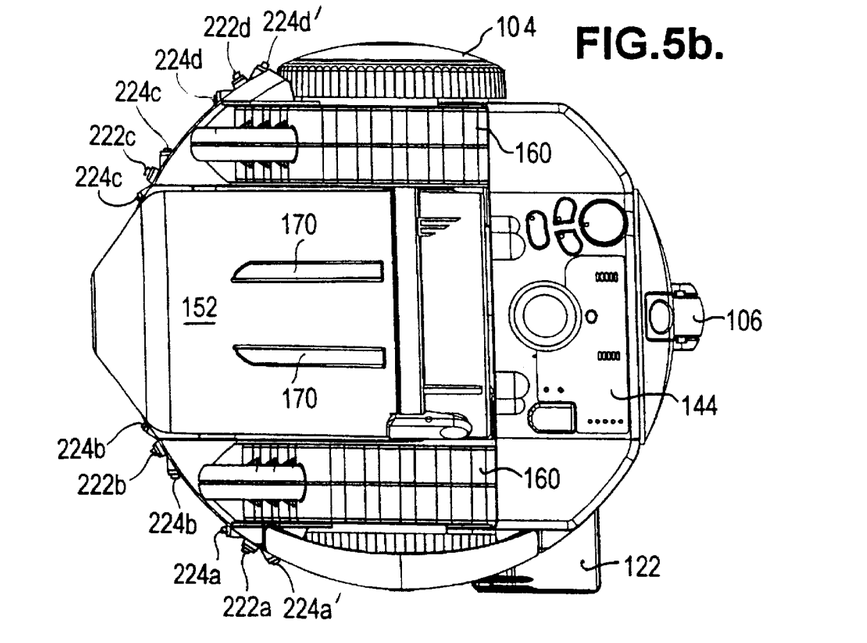

As can be seen from FIGS. 5*a* and 5*b*, the cleaner head 122 is asymmetrically mounted on the chassis 102 so that one side of the cleaner head 122 protrudes beyond the general circumference of the chassis 102. This allows the cleaner 100 to clean up to the edge of a room on the side of the cleaner 100 on which the cleaner head 122 protrudes.

The chassis 102 carries a plurality of sensors which are designed and arranged to detect obstacles in the path of the cleaner 100 and its proximity to, for example, a wall or other boundary such as a piece of furniture. The sensors comprise several ultra-sonic sensors and several infrared sensors. The array of sensors will be described in more detail below. Control software, comprising navigation controls and steering devices for navigating and manoeuvring the cleaner 100 around a defined area in order to clean the carpet or other surface within the area, is housed within a housing 142 located beneath a control panel 144 or elsewhere within the cleaner 100. The specific design of the control software does not form part of the present invention. In the manner of known autonomous vehicles, the control software is able to receive the outputs of the sensors and to drive the motors 105 so that obstacles are avoided whilst following a path specified by algorithms appropriate to the nature of the vehicle. Any appropriate software can be used in this way to navigate the cleaner 100 around a room to be cleaned.

The vacuum cleaner 100 also includes a motor and fan unit 150 supported on the chassis 102 for drawing dirty air into the vacuum cleaner 100 via the suction opening 124 in the cleaner head 122. The chassis 102 also carries a cyclonic separator 152 for separating dirt and dust from the air drawn into the cleaner 100. The inlet port which communicates with the rear portion of the cleaner head 122 via the conduit mentioned above forms the inlet to the cyclonic separator 152. The cyclonic separator, which preferably comprises two cyclones in series, need not be described any further here, being known technology and described adequately elsewhere.

The cyclonic separator 152 is releasable from the chassis 102 in order to allow emptying of the cyclonic separator 152. A hooked catch (not shown) is provided by means of which the cyclonic separator 152 is held in position when the cleaner 100 is in use. When the hooked catch is released (by manual pressing of a button 134 located in the control panel 144), the cyclonic separator 152 can be lifted away from the chassis 102 by means of gripper portions 170. The cyclonic separator 152 can then be emptied.

Two battery packs 160 are located on the chassis 102 on either side of the cyclonic separator 152. The battery packs 160 are identical and are spaced from the central axis of the vacuum cleaner 100 by a significant distance, say between 50 and 150 mm.

The vacuum cleaner 100 described above operates in the following manner. In order for the cleaner 100 to traverse the area to be cleaned, the wheels 104 are driven by the motors 105 which, in turn, are powered by the batteries 160. The direction of movement of the cleaner 100 is determined by the control software which communicates with the sensors which are designed to detect any obstacles in the path of the cleaner 100 so as to navigate the cleaner 100 around the area to be cleaned. The normal forward direction of the cleaner 100 is such that the cleaner head 122 trails behind the driven wheels 104. The battery packs 160 also power the motor and fan unit 150 which draws air into the cleaner 100 via the cleaner head 122 and passes it to the cyclonic separator 152 where the dirt and dust is separated from the airflow. The battery packs 160 are also used to power the motor which drives the brush bar 125 which, in turn assists with pick-up, particularly on carpets. The air which exits the cyclonic separator 152 is passed across the motor and fan unit 150 by appropriate ducting, as is common in many appliances, including vacuum cleaners.

The sensor array forming part of the vacuum cleaner 100 will now be described in more detail. The array comprises a plurality of ultra-sonic sensors and a plurality of infra-red sensors. The majority of the sensors are located in a forward surface 180 of the vacuum cleaner 100. The forward surface 180 is substantially semi-circular in plan view, as can be seen from FIGS. 5*a* and 5*b*. However, further sensors are located at the uppermost extremity of the cleaner 100, at the rear of the cleaner 100, immediately over the brush bar 122, and on the underside of the cleaner 100. Details are given below.

Figure 3:
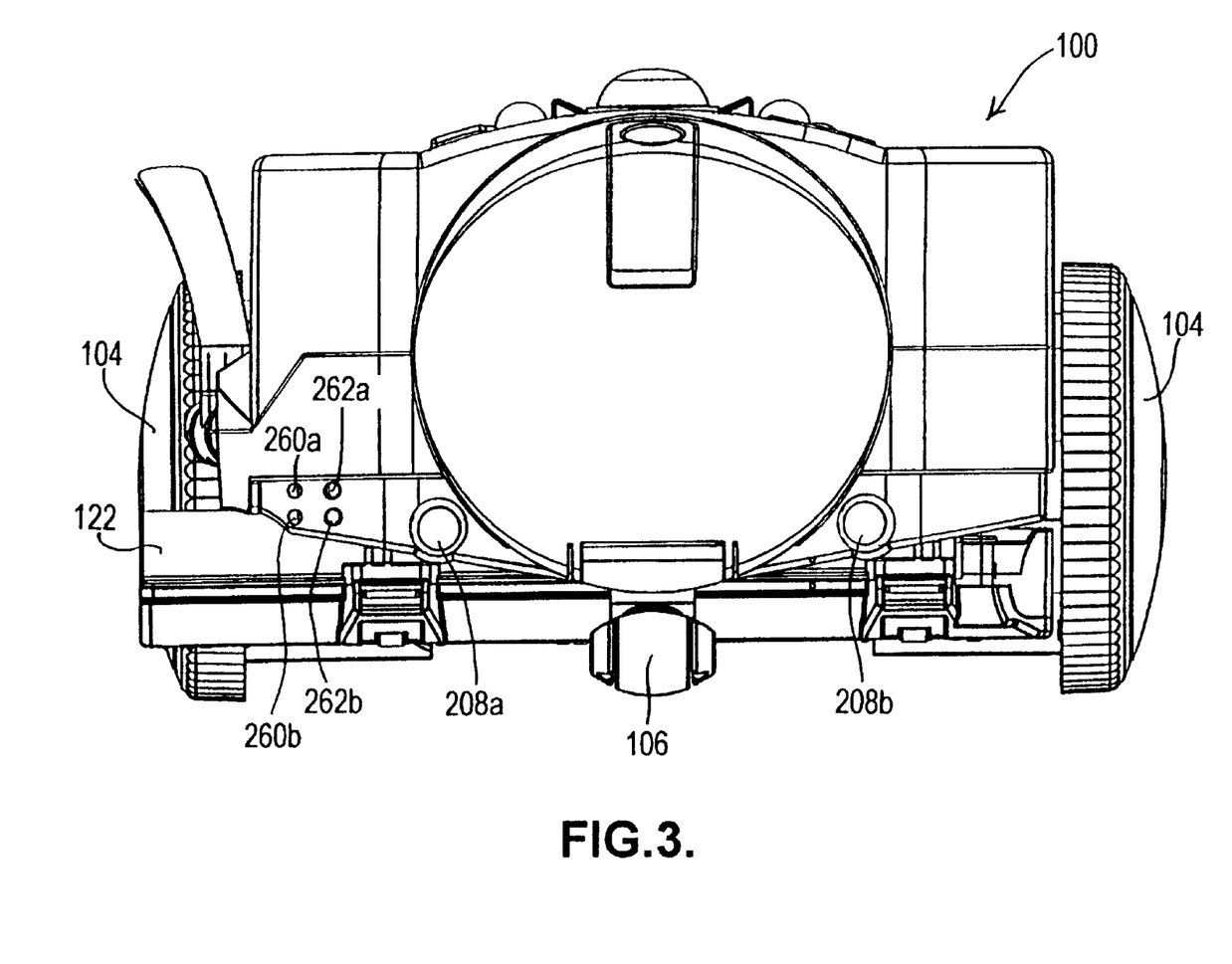
FIG. 3 is a rear view of the autonomous vehicle of FIG. 1.

Three ultra-sonic sensors 202, 204 and 206, each consisting of an ultra-sonic emitter and an ultra-sonic receiver, are positioned in the forward surface 180. A first of the said ultra-sonic sensors 202, comprising an emitter 202*a* and a receiver 202*b*, is directed in a forward direction so that the emitted signals are transmitted in the normal forward direction of travel of the cleaner 100. A second ultra-sonic sensor 204, comprising an emitter 204a and a receiver 204b, is directed such that the emitted signals are transmitted outwardly to the left of the cleaner 100 in a direction which is perpendicular to the direction of transmission by the ultrasonic sensor 202. A third ultra-sonic sensor 206, comprising an emitter 206a and a receiver 206b, is directed such that the emitted signals are transmitted outwardly to the right of the cleaner 100 in a direction which is perpendicular to the direction of transmission by the ultra-sonic sensor 202 and opposite to the direction of transmission by the ultra-sonic sensor 204. A fourth ultra-sonic sensor 208, comprising an emitter 208a and a receiver 208b, is located in the rear of the cleaner 100 (see FIG. 3) and is directed rearwardly so that the emitted signals are transmitted parallel to the normal forward direction of travel of the cleaner 100 but in the opposite direction. These four sensors 202, 204, 206, 208 detect the presence of walls and obstacles to the front, left, right and rear of the cleaner 100.

Figure 1:
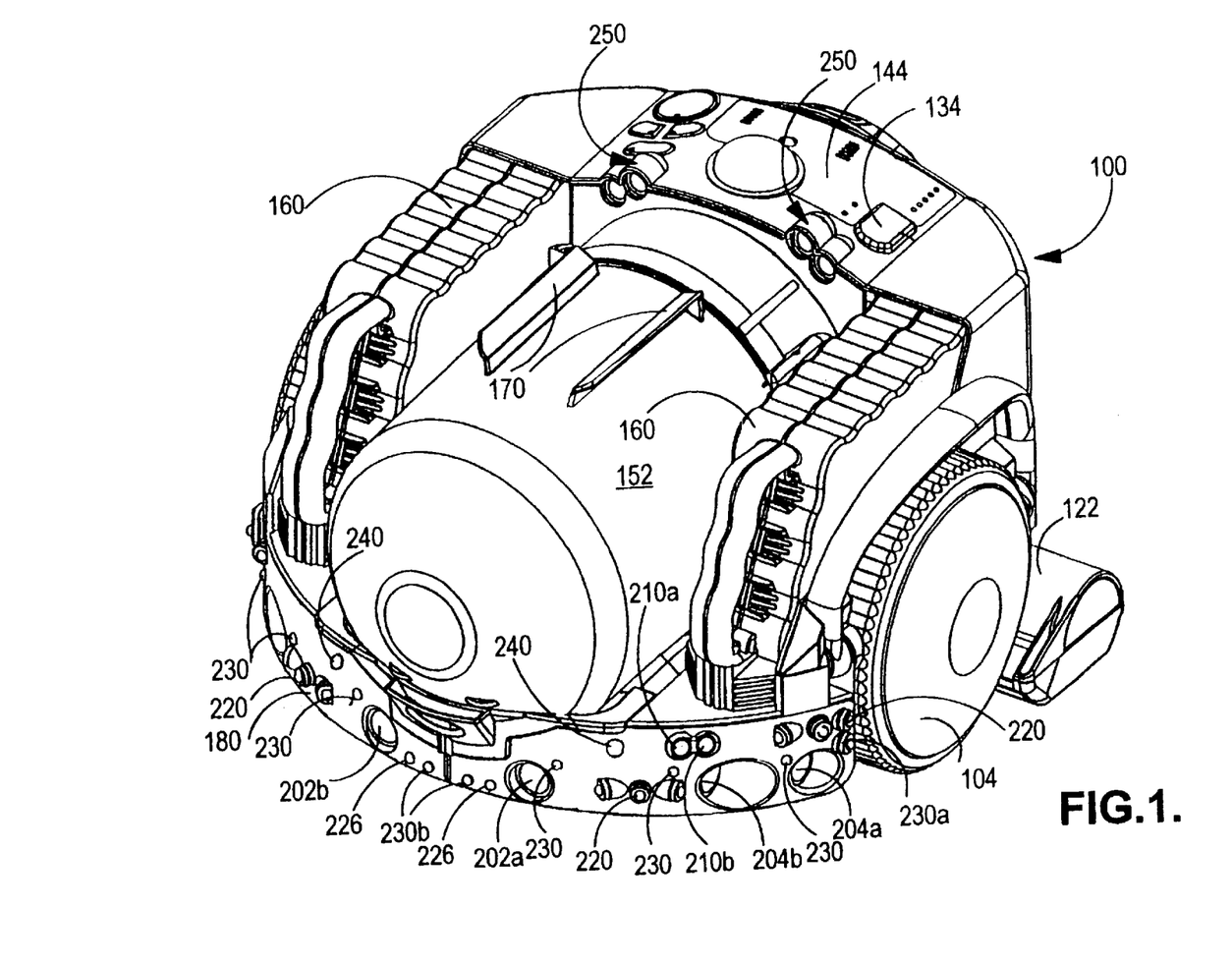
FIG. 1 is a perspective view of an autonomous vehicle, specifically a vacuum cleaner, according to an embodiment of the invention.
Figure 2:
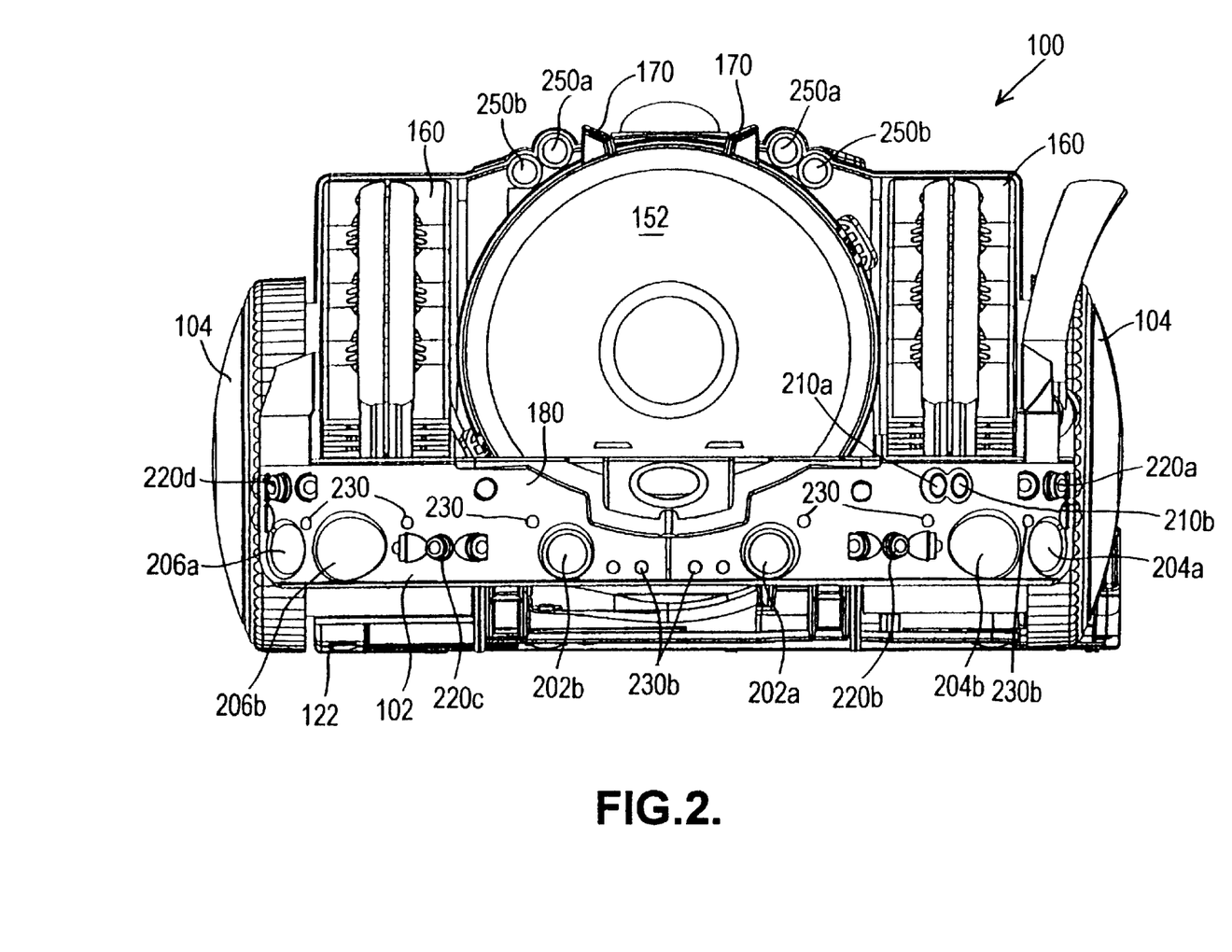
FIG. 2 is a front view of the autonomous vehicle of FIG. 1.

A fifth ultra-sonic sensor 210 is located in the forward surface 180. The fifth ultra-sonic sensor 210 comprises an emitter 210a and a receiver 210b. The fifth ultra-sonic sensor 210 is positioned so that the emitter 210a transmits at an angle which is substantially midway between the directions in which the forward- and left-looking sensors 202, 204 transmit. In the embodiment, the sensor 210 transmits in a direction of 45° to the normal forward direction of travel of the vacuum cleaner 100. As can be seen from FIG. 1, the sensor 210 transmits to the side of the cleaner 100 on which the cleaner head 122 protrudes.

Figure 8:
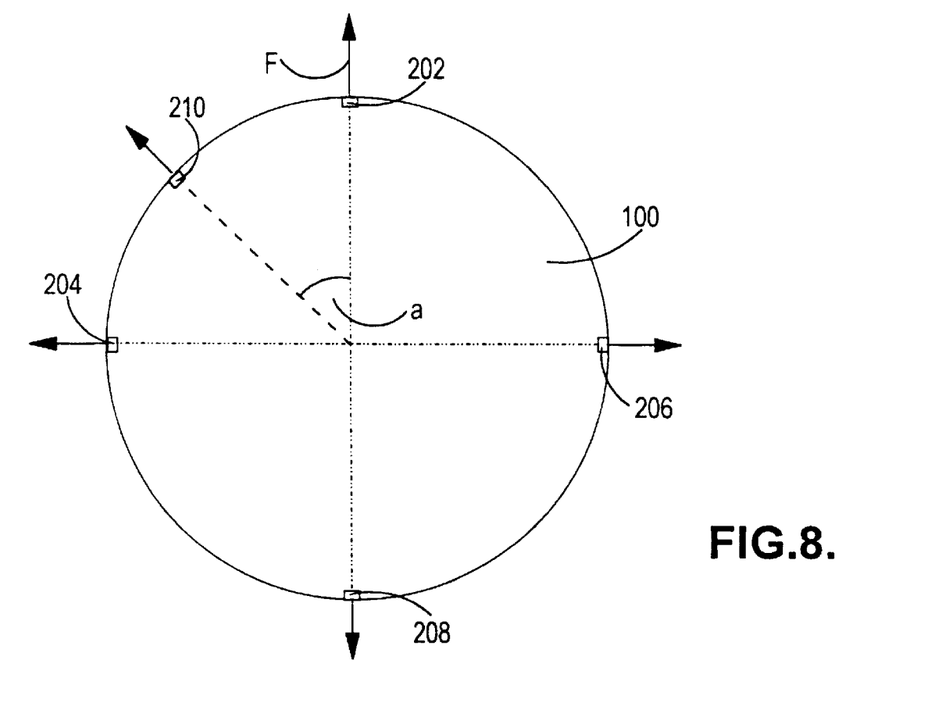
FIG. 8 is a schematic view illustrating the positioning of ultra-sonic sensors on the autonomous vehicle of FIG. 1.

FIG. 8 shows schematically the arrangement of ultra-sonic sensors 202, 204, 206, 208 and 210 on the vacuum cleaner 100 if the normal direction of forward travel is along the arrow F. In the arrangement shown, the angle a is 45°, although variations to this arrangement are possible.

The inclusion of the sensor 210 provides the vehicle 100 with greater angular control as it moves along a wall or other obstacle with the cleaner head 122 close to the wall. The sensor 210 is able to detect the presence of a wall or similar large obstacle and, if the wall or other obstacle alongside which the vehicle is moving disappears (for example, when a corner is encountered), then the vehicle 100 is made aware of the change earlier than it would have been if the sensor 210 had not been present. This allows the vehicle to take account of corners and other changes in its environment with greater accuracy and manoeuvrablity.

Figure 7:
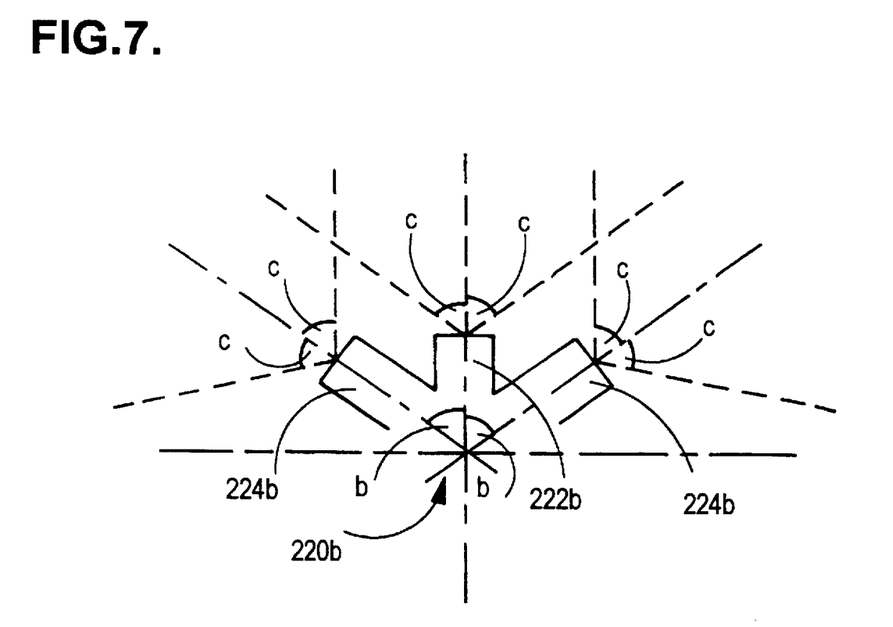
FIG. 7 is a schematic view illustrating the grouping of infra-red sensors on the autonomous vehicle of FIG. 1.

A plurality of infra-red sensors are also included in the forward surface 180. The infra-red sensors comprise emitters 220 and receivers 230. Most of the emitters 220 are arranged in four groups of three which are spaced substantially evenly around the forward surface 180. A first emitter group 220a comprises a central emitter 222a and two side emitters 224a. A second emitter group 220b comprises a central emitter 222b and two side emitters 224b. A third emitter group 220c comprises a central emitter 222c and two side emitters 224c and a fourth emitter group 220d comprises a central emitter 222d and two side emitters 224d. One of the emitter groups 220b is illustrated in FIG. 7. Each side emitter 224b is arranged at an angle b of approximately 60° to the central emitter 222b. Each emitter 222b, 224b has a beam angle c of approximately 50°. This arrangement creates a field of relatively even emitted signals covering an angle of substantially 170° to 180°. It will be appreciated that a similar field can be created by providing a larger number of emitters, each having a smaller beam angle than the arrangement illustrated in FIG. 7.

Figure 6:
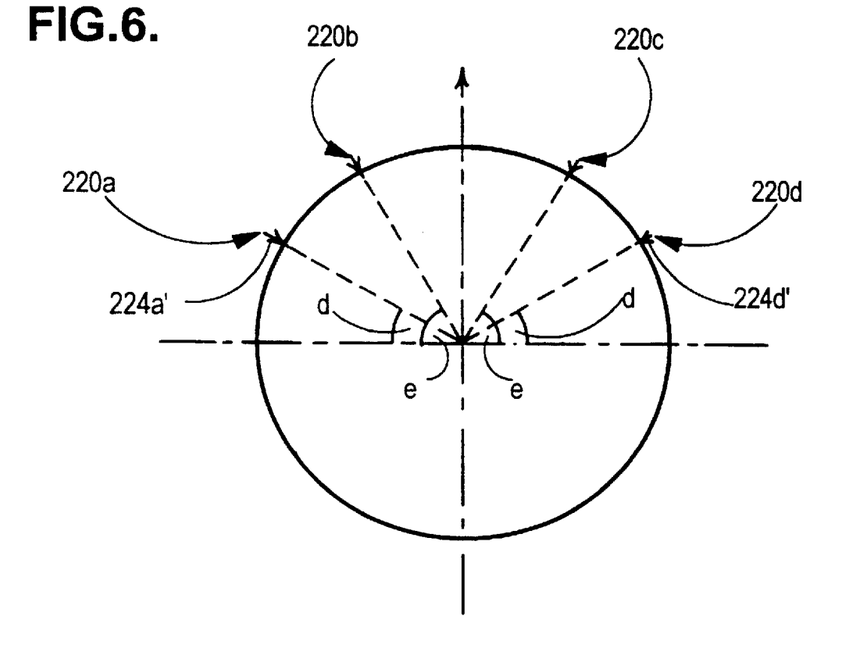
FIG. 6 is a schematic view illustrating the positioning of infrared sensors on the autonomous vehicle of FIG. 1.

FIG. 6 illustrates the arrangement of the emitter groups 220a, 220b, 220c, 220d on the cleaner 100. As will be seen from the figure, the first emitter group 220a is located at the end of a radial line extending at an angle d of 30° to the transverse axis 190 of the cleaner 100 on the left side thereof. The fourth emitter group 220d is located at the end of a radial line also extending at an angle d of 30° to the transverse axis 190 but on the right side of the cleaner 100. The second and third emitter groups 220b, 220c are located at the ends of radial lines extending at an angle e of 60° to the transverse axis 190 on the left and right sides of the cleaner 100 respectively. The third emitter group 220c is identical to the second emitter group 220b as illustrated in FIG. 7. However, the first and fourth emitter groups 220a, 220d each have one side emitter 224a, 224d which is specifically directioned so that the signal emitted is parallel to the transverse axis 190. This is achieved, in this specific case, by varying the angle b between the relevant central emitter 222a, 222d and the respective side emitter 224a, 224d from 60° to 30°. It will be appreciated that, if either of the angles b and d differ from the values given above, then the extent of the variation in angle b between the relevant central emitter 222a, 222d and the respective side emitter 224a, 224d will need to be adjusted so that the side emitter 224a, 224d remains directed outwardly in a direction parallel to the transverse axis 190. Two additional emitters 226 are positioned close to the central axis of the cleaner 100 and are directioned so that they emit signals in a substantially forward direction with respect to the normal direction of travel.

The first and fourth emitter groups 220a, 220d are located in a horizontal plane which is vertically spaced from the horizontal plane in which the second and third emitter groups 220b, 220c are located. The first and fourth emitter groups 220a, 220d are located at a higher level than the second and third emitter groups 220b, 220c. The additional emitters 226 are also spaced vertically from the two aforementioned horizontal planes. The arrangement is symmetrical about the longitudinal axis of the cleaner 100. The whole of the array of emitters is designed so that at least two of the emitters will send signals directly to any point in the path of the cleaner (in the forward direction). (This will not apply, of course, to points which are extremely close to the cleaner itself.)

The receivers 230 are spaced substantially evenly around the forward surface 180. A first receiver 230a is located adjacent each of the emitters 224a, 224d which are directioned parallel to the transverse axis 190 so as to receive signals therefrom. These receivers 230a are specifically paired with the emitters 224a, 224d. The remaining receivers 230b are spaced substantially evenly around the forward surface 180 and are not paired with any of the emitters at all. The receivers 230 are all located in a single horizontal plane with the exception of two central receivers 230b which are located adjacent the forward-looking emitters 226. The lack of pairing of the receivers with the emitters gives the cleaner 100 an enhanced ability to detect its position within an environment and with respect to objects and obstacles.

Two passive infra-red detectors 240 are located in the forward surface 180 for the purpose of detecting heat sources such as humans, animals and fires. The passive infra-red detector 240 is directioned so that it looks in a forward direction to detect heat sources in its path. Two forward-looking ultra-sonic sensors 250, each comprising an emitter 250a and a receiver 250b, are positioned at an uppermost extremity of the cleaner 100 so that they are able to sense obstacles immediately in front of the cleaner and at or near an uppermost extremity thereof. In this case, the sensors 250 are positioned in the casing of the fan and motor unit 150 so that they both look along the uppermost edge of the cyclonic separator 152. The direction of each sensor 250 is parallel to the direction of the other sensor 250. The sensors 250 are able to detect any obstacles which are at a sufficiently high level not to be detected by the sensors arranged in the forward surface 180 but which would constitute an obstruction to the forward movement of the cleaner 100. Rearward-looking sensors could also be provided at a high level if required, but none is shown in the embodiment illustrated in the drawings. It will be appreciated that a similar effect can be achieved using sensors (preferably ultra-sonic sensors) positioned lower on the cleaner than the uppermost extremity but directioned so as to look towards the appropriate area adjacent the uppermost extremity in front of the cleaner 100.

Figure 9:
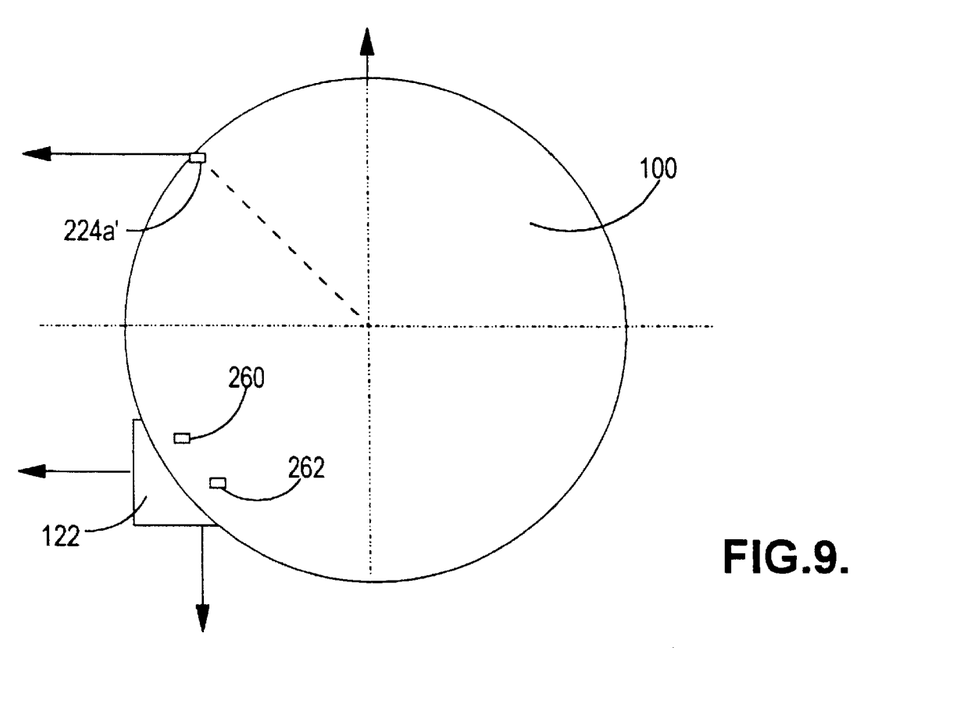
FIG. 9 is a schematic view illustrating the positioning of further infra-red sensors on the autonomous vehicle of FIG. 1.

Further infra-red sensors 260, 262 are positioned on the chassis 102 immediately above the protruding end of the cleaner head 122. Each sensor 260, 262 comprises an emitter 260*a*, 262*a* and a receiver 260*b*, 262*b*. The first of these sensors 260 is directioned so that the emitter 260*a* emits a signal in a direction parallel to the longitudinal axis of the cleaner head 122 or of the brush bar 125. The direction of the signal from the sensor 260 is therefore perpendicular to the forward direction of travel and parallel to the direction of the signal emitted by emitter 224*a*. The sensor 260 is thus able to detect the distance of a wall or other obstacle along which the cleaner 100 is intended to travel. In combination with the emitter 224*a* and the receiver 230*a*, the sensor 260 is also able to maintain the direction of travel of the cleaner 100 parallel with the wall or other obstacle along which the cleaner 100 is intended to travel. This is achieved by way of the parallel signals being maintained essentially identical. Any variation between the two signals can be easily recognised and the path of the cleaner 100 can then be adjusted to compensate for the discrepancy. The arrangement is illustrated in FIG. 9. As will be seen from the figure, the distance between the directions of the two signals is approximately one half of the length of the cleaner 100, although this can be varied to a considerable extent. Preferably, the distance will not be less than a quarter of the length of the vehicle nor more than three quarters thereof.

The second of the further infra-red sensors 262 is directioned so that the emitter 262*a* sends a signal rearwardly in a direction parallel to the direction of travel of the cleaner 100. The sensor 262 is able to detect the presence of an obstacle on which the cleaner head 122 may become lodged if the cleaner 100 were traveling in a rearward direction or turning or rotating about a vertical axis.

Infra-red sensors 272, 274, 276 are provided on the underside of the cleaner 100. Each sensor 272, 274, 276 is directioned so that it looks downwardly towards the surface across which the cleaner 100 travels and which the cleaner 100 is intended to clean. Two downward-looking sensors 274, 276 are provided in the chassis 102 immediately in front of each of the driven wheels 104. A further downward-looking sensor 272 is provided at the front edge of the chassis 102 and on or close to the longitudinal axis of the cleaner 100. Each sensor 272, 274, 276 comprises an emitter and a receiver. In the embodiment illustrated, the outermost component of each sensor 274, 276 is a receiver and the innermost component is an emitter. Each of the sensors 272, 274, 276 is capable of detecting the presence or absence of the surface across which the cleaner 100 travels. A signal is sent to the control software to bring the cleaner 100 to a halt, or to turn, immediately one of the sensors 274, 276 detects that the surface is absent. This is likely to be due to the presence of a stairway or other edge of the surface. The cleaner 100 is thus prevented from falling from a height in the event that a stairway or other edge is encountered. For safety reasons, each of the sensors located in front of each wheel is connected to the control software via different circuits so that, should one circuit fail, the other sensor will still be functional in order to avoid an accident occurring. Further downlooking sensors 278, 280 are provided on the underside of the cleaner 100 adjacent the periphery of the cleaner. Side downlooking sensors 278, 280 are arranged to detect the presence of a surface adjacent a side edge of the vehicle outside of the path of the wheel and forward of the wheel, in the normal direction of movement of the vehicle. The normal, forward, direction of movement of the vehicle is shown as arrow 290. These downlooking sensors 278, 280 look diagonally downwards, so that the sensors can be mounted on the underside of the cleaner where they are protected from damage.

Figure 10:
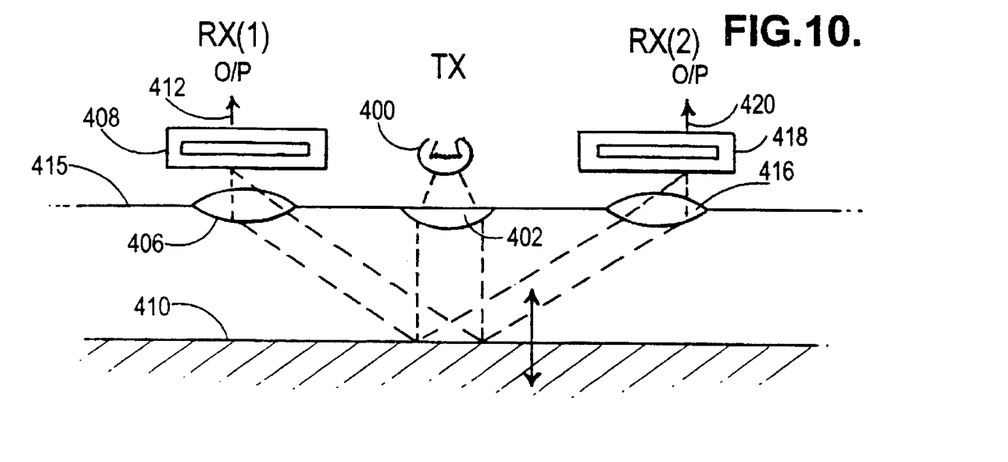
FIG. 10 shows the form of a downlooking sensor.

FIG. 10 shows the form of a downlooking sensor, mounted in the underside 415 of the vehicle for detecting the presence of surface 410 in proximity to the vehicle. A transmit part of the sensor comprises a source 400, typically on LED, a lens 402 for forming an output of source 400 into a collimated beam directed downwards towards surface 410. A receive part comprises a lens 406 for gathering light reflected by surface 410 and a sensor 408 which generates an output 412 for feeding to control circuitry. Sensor 408 is a position sensitive device (PSD) which provides an output that varies according to the position of received light on the sensor. As surface 410 moves nearer or further from the receiver, the position of received light reflected from surface 410 moves across the target of sensor 408 as shown by the double-headed arrows. The PSD is typically a light-sensitive semiconductor device. For safety reasons it is preferred that a second light receiving part is provided 416, 418. This second receiving part 416, 418 is located on the opposite side of the transmit part to the first receive part and generates an output for feeding to control circuitry. Should either or both of the output signals 412, 420 indicate the absence of a surface beneath the cleaning device, the control circuitry stops the cleaning device.

Figure 11:
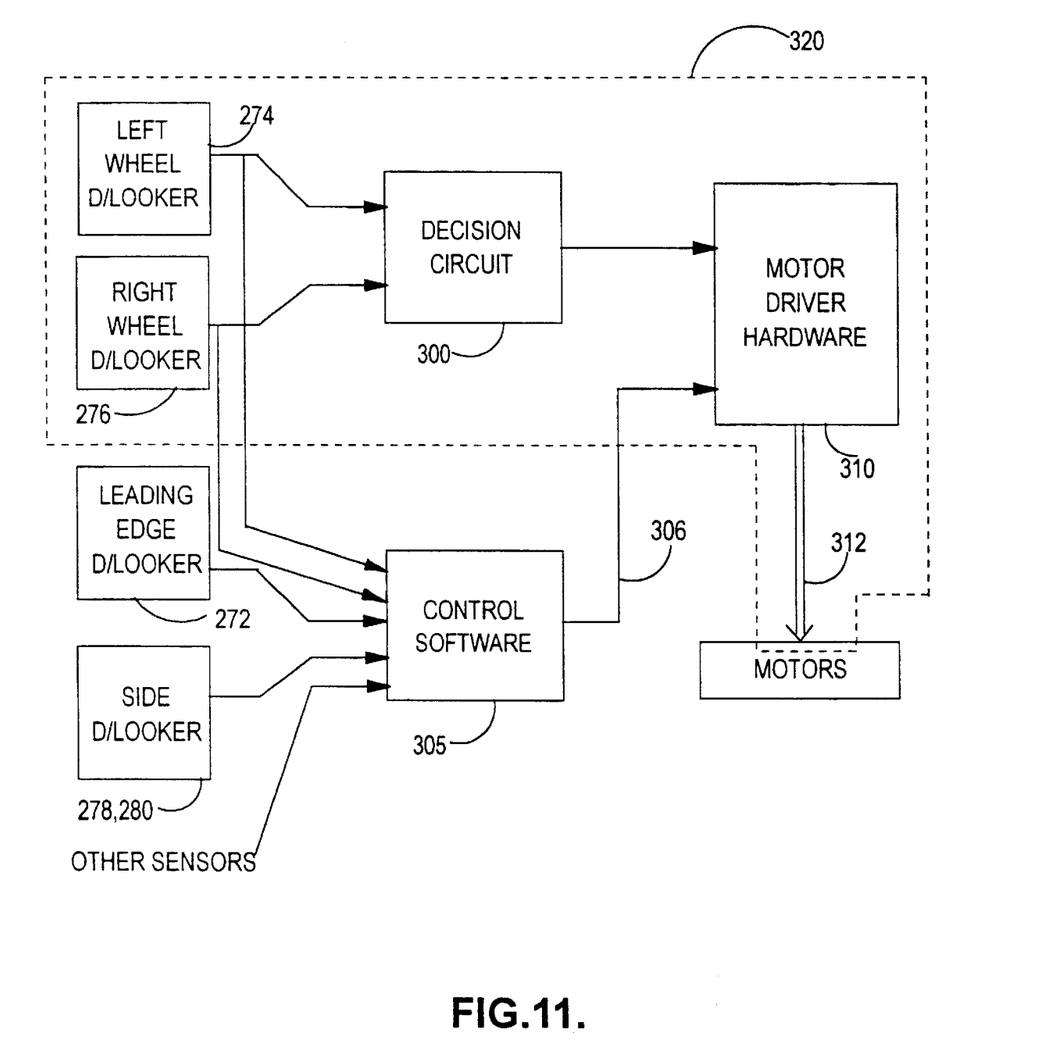
FIG. 11 schematically shows how the downlooking sensors are used by the control system for the vehicle.

FIG. 11 schematically shows how the downlooking sensors are used by the control system for the vehicle. Outputs from the left and right wheel downlooking detectors 274, 276 are fed to a decision circuit 300. This examines the output signals and decides whether the surface is close enough to the vehicle. This can be achieved by a comparison of voltage levels: a first voltage provided by the downlooking sensor being compared with a threshold voltage representing an acceptable surface distance. Other decision techniques can be used. An output from the decision circuit 300 is fed to motor driver hardware 310, which provides output signals 312 to operate the motors for driving the wheels 104 of the vehicle. Motor driver hardware is responsive to both the signal from the decision circuit 300 and to an output from control software 305. For safety reasons, the wheel downlooking sensors 274, 276 directly control the motors in hardware. All of the elements in the control path, shown by dashed box 320, are hardware. This is to prevent any delay in braking the wheels in the event that the vehicle reaches an edge of a surface. The wheel downlooking sensors 274, 276 as well as the leading edge downlooker 272, side downlookers 278, 280 and other sensors feed their respective outputs, via suitable interface circuitry, to control software 305 which controls movement of the vehicle. Control software 305 provides outputs 306 to the motor driver hardware 310. The control software is able to use the sensor outputs to guide the vehicle in a manner that is more flexible that just relying on the wheel downlooking sensors.

Figure 12:
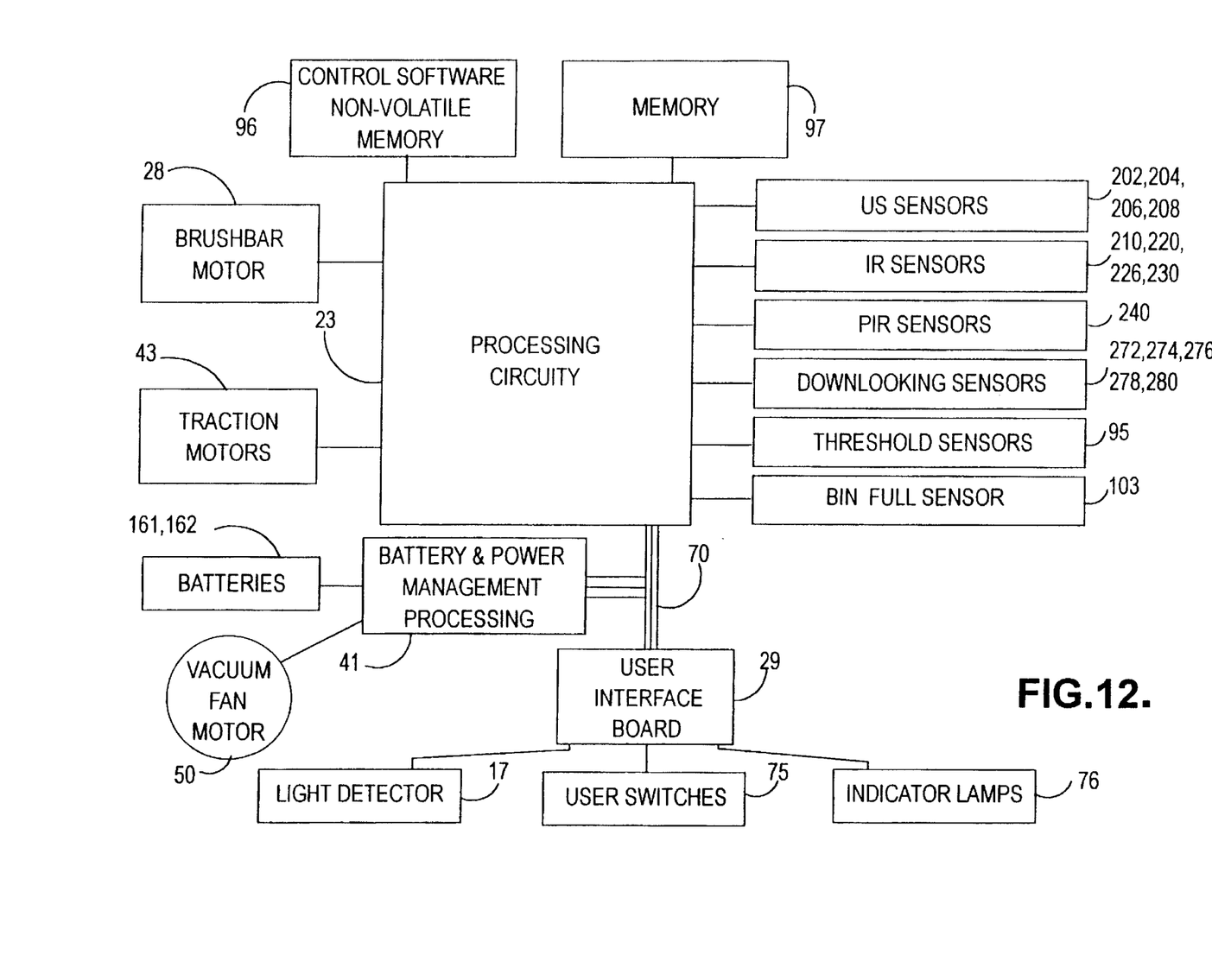
FIG. 12 shows a control system for the cleaner.

FIG. 12 shows a control system for the cleaner. It comprises two rechargeable batteries 161, 162, a battery and motor management system 41, a motor 50 for driving a suction fan, traction motors 43 for driving the left and right hand wheels 104 of the vacuum cleaner, a motor 28 for driving the brush bar of the vacuum cleaner and processing circuitry 23, which includes a microprocessor and field programmable gate arrays (FPGA). A user interface board 29 provides a plurality of user switches 75 by which a user can control the cleaning device and a plurality of indicator lamps 76 by which the cleaning device can indicate to the user. The user interface board also couples to the light detector 17, as the upper face of the cleaning device provides the light detector with an unobstructed view of the environment. The microprocessor and FPGA share tasks, with the FPGA mainly being used to process data from the ultrasonic sensors, extracting the important information from the signals received by the ultrasonic receivers. A communications bus 70 couples the processing circuitry 23 to the battery and motor management system 512 and the user interface board 29.

A non-volatile memory 96, such as a ROM or FLASH ROM, stores the control software, another memory 97 is used during normal operation of the device. The movement control sensors described above are coupled to the processing circuitry 23.

Figure 13:
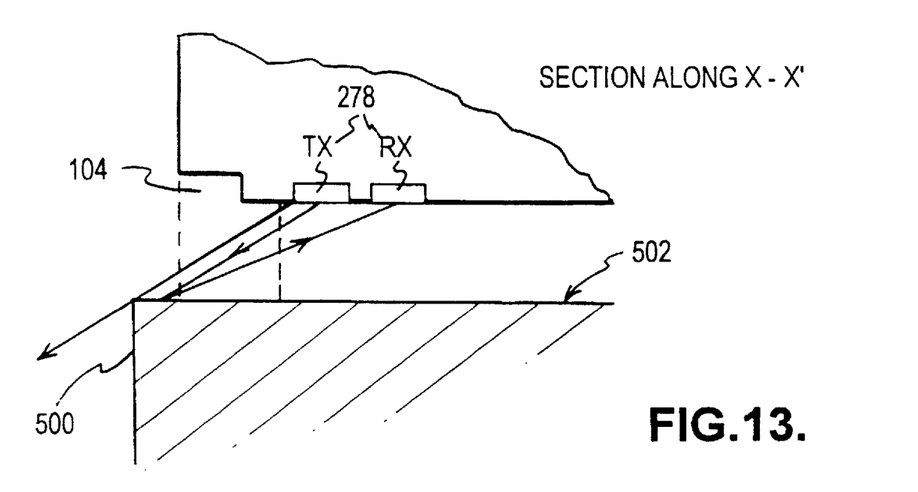
FIG. 13 shows one example of a sideways downlooking sensor.

FIG. 13 shows one example of a side downlooking sensor 278 for following an edge of a floor surface. It is preferred to provide a side downlooking sensor looks sideways, from a mounting position on the cleaning device which lies within the envelope of the cleaning device. The sideways downlooking sensor comprises a transmit part TX and a receive part RX. Both the TX and RX parts are angled downward and outward from the underside of the cleaner to sense the presence of an edge of a surface 500 outside the path of the wheel 104 of the cleaner. Mounting the sensor within the envelope of the vehicle has the advantage that the vehicle's exterior is not cluttered by sensors, which could become caught on obstacles or become damaged. The sideways looking sensor operates in the same manner as the sensor shown in FIG. 10. As an alternative to the sideways diagonally downlooking sensor shown here, a downlooking sensor could be provided which looks directly downwards and which is mounted on an arm which extends sufficiently outwardly from the side of the cleaning device that the sensor has a clear line-of-sight to the floor surface.

Figure 14:
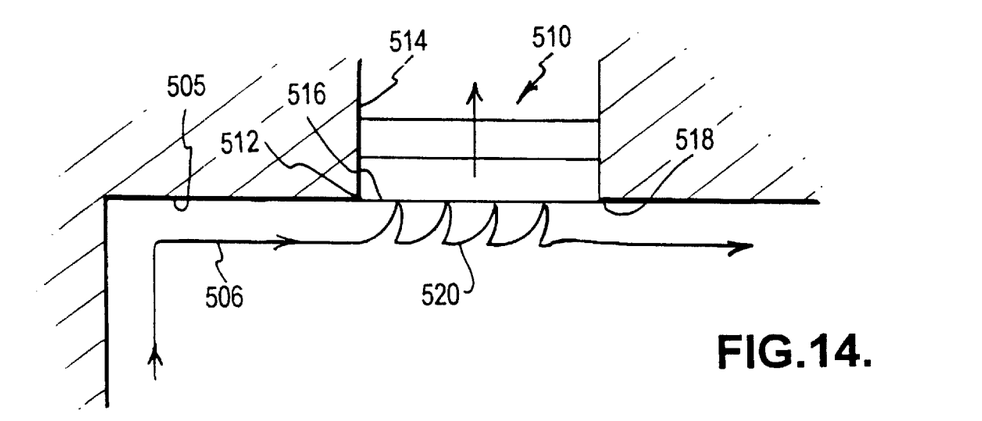
FIGS. 14 and 15 show two ways in which the cleaner can operate when the cleaner reaches an edge of a surface that it is cleaning.
Figure 15:
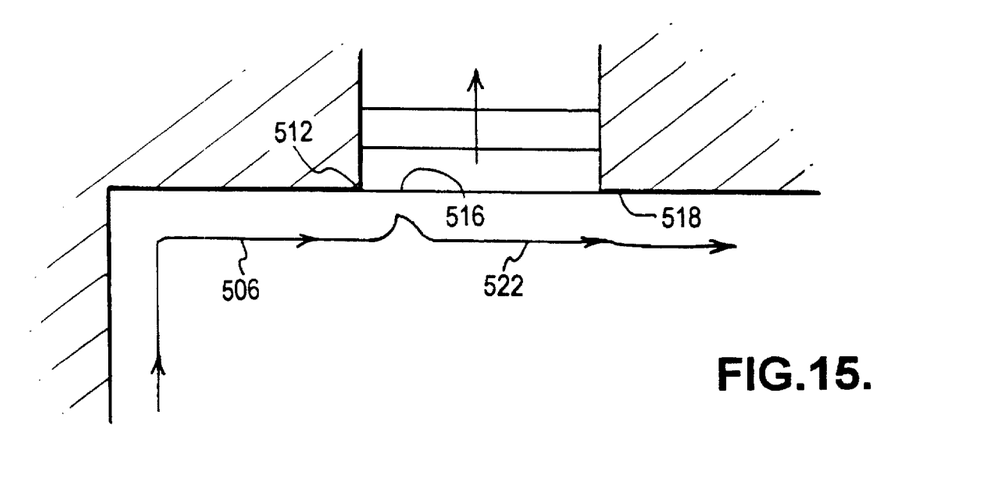

FIGS. 14 and 15 show two ways in which the cleaner can operate when the cleaner reaches an edge of a surface that it is cleaning. In FIG. 14 the cleaner does not have a side downlooking sensor. Numeral 510 represents a descending staircase extending from corner 512 of a room. In use, the cleaner follows wall 505, along path 506. It reaches corner 512 and attempts to follow the wall 514 extending from the corner. However the cleaner senses edge 516 at the top of the staircase using its leading edge sensor. The cleaner then enters an edge following routine in which it reverses from the edge and then moves forward at a shallow angle to the edge, until its leading edge sensor 272 again senses the absence of a surface beneath the leading edge of the cleaning device. It repeats this maneuver in a zig-zag fashion until it reaches wall 518.

FIGS. 14 and 15 show two ways in which the cleaner can operate when the cleaner reaches an edge of a surface that it is cleaning. In FIG. 14 the cleaner does not have a side downlooking sensor. Numeral 510 represents a descending staircase extending from corner 512 of a room. In use, the cleaner follows wall 505, along path 506. It reaches corner 512 and attempts to follow the wall 514 extending from the corner. However, the cleaner senses edge 516 at the top of the staircase using its leading edge sensor. The cleaner then enters an edge following route in which reverses at a fairly and then moves forward at a shallow angle to the edge, until its leading edge sensor 272 again senses the absence of a surface beneath the leading edge of the cleaning device. It repeats this manoeuvre in a zig-zag fashion until it reaches wall 518.

In FIG. 15 the cleaner is provided with a sideways downlooking sensor. As before, it approaches along path 506 until it reaches corner 512 and attempts to follow the wall. Leading edge sensor senses the edge 516 of the staircase and using the sideways downlooking sensor 278, the cleaner follows edge 516 until it reaches wall 518.

Figure 16:
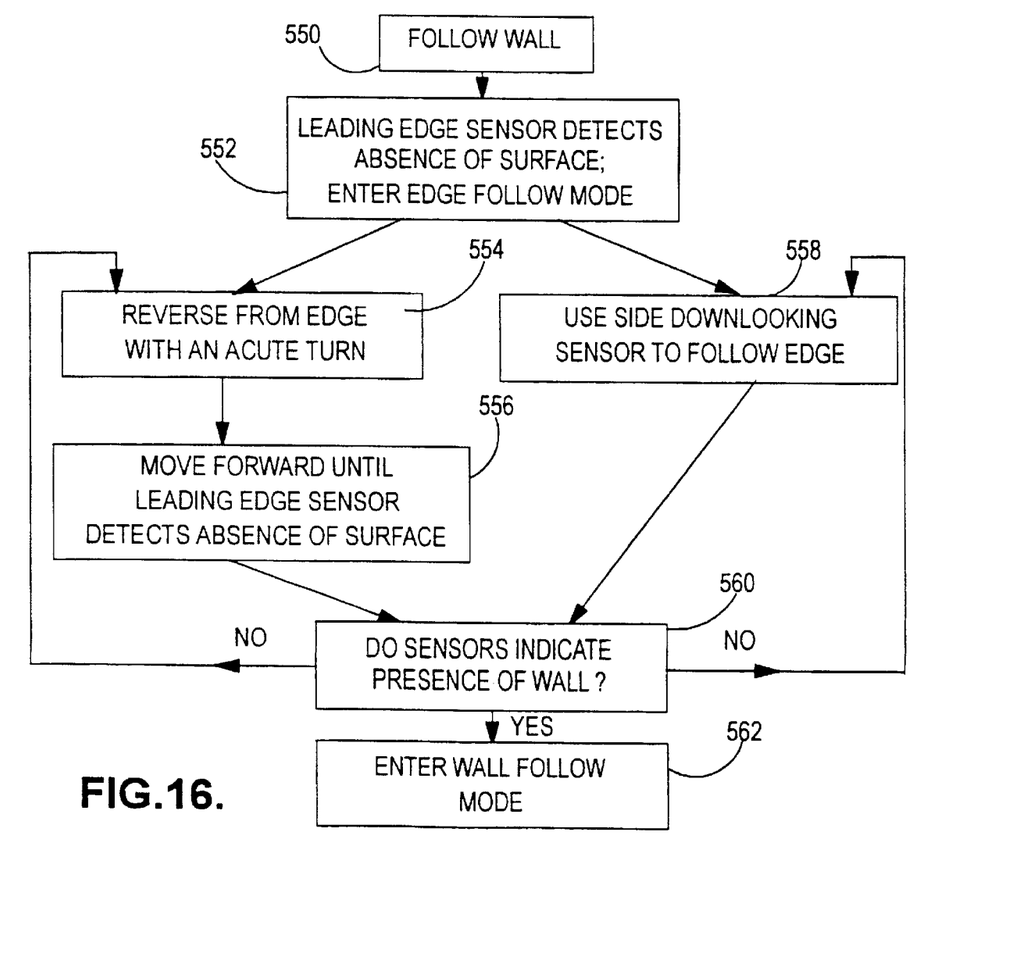
FIG. 16 is a flow diagram of a method for operating the cleaner.

FIG. 16 is a flow diagram illustrating one way in which control software (305, FIG. 11) can operate the cleaner. The cleaner usually operates in "wall follow" mode to follow the perimeters of a room either adjacent the wall, or a multiple of cleaner widths from the wall, at step 550. At step 552 the cleaner detects the absence of a surface using its leading edge sensor. It then enters an edge following mode which can take several forms. Steps 554, 556, 560 represent the zig-zag mode previously described, whereas step 558, 560 represent the side downlooking sensor mode. When the presence of a wall is sensed, the cleaner re-enters wall following mode.

The invention is not limited to the precise details of the embodiment illustrated and described above. Although the vehicle described is a vacuum cleaner, it will be appreciated that the sensor arrangement can be applied to any other type of autonomous vehicle which is required to propel itself across a surface without human intervention and without colliding with obstacles or objects in its path. Domestic appliances are becoming increasingly sophisticated and it is envisaged that domestic appliances other than vacuum cleaners will become autonomous over the years. The sensor arrangement described above will be equally applicable thereto.

What is claimed is:

1. An autonomous vehicle comprising wheels for supporting the vehicle and for allowing the vehicle to traverse a surface, downward looking wheel sensors for sensing whether there is a surface in front of the wheels, a further sensor at or near a leading edge of the vehicle for sensing whether there is a surface beneath the leading edge of the vehicle and a control apparatus for controlling movement of the vehicle, the control apparatus being arranged to permit movement of the vehicle when the leading edge sensor senses that there is no surface beneath the leading edge of the vehicle, provided that the wheel sensors indicate that there is a surface adjacent the wheel.

2. A vehicle according to claim 1 wherein the control apparatus is arranged so that, when the leading edge sensors senses the absence of a surface beneath the leading edge of the vehicle, the vehicle performs an edge following routine.

3. A vehicle according to claim 2 arranged so that, the edge following routine is repetitive and causes the vehicle to reverse and then move forward at an angle to the leading edge until the leading edge sensor again senses the absence of a surface beneath the leading edge of the vehicle.

4. A vehicle according to claim 2 provided with a further downward looking sensor for sensing the presence of a surface adjacent a side edge of the vehicle outside of the path of the wheel, and wherein the edge following routine uses an output from the side edge sensor to follow the edge of a surface.

5. A vehicle according to claim 4 wherein the side edge sensor is mounted on the vehicle within the path of the wheel and is angled diagonally downward and outwardly from the vehicle to sense the presence of a surface adjacent a side edge of the vehicle outside of the path of the wheel.

6. A vehicle according to claim 4 or 5 wherein the side edge sensor senses the presence of a surface adjacent a side edge of the vehicle outside of the path of the wheel and forward of the wheel, in a direction normal to a direction of movement of the vehicle.

7. A vehicle according to claim 4 wherein the further sensor is mounted on an underside of the vehicle.

8. A vehicle according to claim 1, wherein the control apparatus further comprises a second control path which is arranged to receive inputs from only the downward looking wheel sensors, the second control path being arranged to stop the vehicle when the downward looking wheel sensors sense the absence of a surface adjacent the wheel, and wherein the second control path is implemented entirely in hardware.

9. A vehicle according to claim 1 in the form of an autonomous cleaning device.

10. A vehicle according to claim 1 in the form of an autonomous vacuum cleaner.

11. A method of operating an autonomous vehicle with wheels for supporting the vehicle and for allowing the vehicle to traverse a surface and a control apparatus for controlling movement of the vehicle, comprising:

receiving information from downward looking wheel sensors which sense a presence of a surface in front of the wheel; and controlling movement of the vehicle so as to permit movement of the vehicle when a leading edge sensor senses that there is no surface beneath a leading edge of the vehicle, provided that the downward looking wheel sensors indicate a presence of a surface adjacent the wheel.

12. Software for performing a method of controlling operation of an autonomous vehicle comprising wheels for supporting the vehicle and for allowing the vehicle to traverse a surface, and a control apparatus for controlling movement of the vehicle, the software causing the control apparatus to:

receive information from downward looking wheel sensors, which sense whether there is a surface in front of the wheel, and from a further sensor, which senses whether there is a surface beneath the leading edge of the vehicle; and, control movement of the vehicle so as to permit movement of the vehicle when the leading edge sensor senses that there is no surface beneath the leading edge of the vehicle, provided that the wheel sensors indicate that there is a surface adjacent the wheel.

13. Control apparatus for controlling operation of an autonomous vehicle comprising wheels for supporting the vehicle and for allowing the vehicle to traverse a surface, the control apparatus being arranged to:

receive information from downward looking wheel sensors, which sense whether there is a surface in front of the wheel, and from a further sensor, which senses the presence of a surface beneath the leading edge of the vehicle; and control movement of the vehicle so as to permit movement of the vehicle when the leading edge sensor senses that there is no surface beneath the leading edge of the vehicle, provided that the wheel sensors indicate that there is a surface adjacent the wheel.

* * * * *

UNITED STATES PATENT AND TRADEMARK OFFICE
CERTIFICATE OF CORRECTION

PATENT NO. : 6,493,612 B1
DATED : December 10, 2002
INVENTOR(S) : David Lindsey Bisset et al.

It is certified that error appears in the above-identified patent and that said Letters Patent is hereby corrected as shown below:

Title page,
Item [57], ABSTRACT,
Line 6, after "presence", insert -- of a surface --.

Column 10,
Line 58, change "sensors" to -- sensor --.

Signed and Sealed this

Twenty-fourth Day of June, 2003

JAMES E. ROGAN
*Director of the United States Patent and Trademark Office*